(12) United States Patent
Stewart et al.

(10) Patent No.: US 12,549,077 B2
(45) Date of Patent: Feb. 10, 2026

(54) BACKSPIN MONITOR

(71) Applicant: Halliburton Energy Services, Inc., Houston, TX (US)

(72) Inventors: Mark Dale Stewart, Tulsa, OK (US); Craig Lee Cooper, Inola, OK (US); Ryan Bridwell Ashbaugh, Broken Arrow, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 215 days.

(21) Appl. No.: 18/099,686

(22) Filed: Jan. 20, 2023

(65) Prior Publication Data

US 2024/0250586 A1 Jul. 25, 2024

(51) Int. Cl.
*H02K 11/35* (2016.01)
*H02K 11/26* (2016.01)
*E21B 43/12* (2006.01)

(52) U.S. Cl.
CPC .............. *H02K 11/35* (2016.01); *H02K 11/26* (2016.01); *E21B 43/128* (2013.01)

(58) Field of Classification Search
CPC ...... H02K 11/35; H02K 11/26; E21B 43/128; E21B 47/008
See application file for complete search history.

(56) References Cited

U.S. PATENT DOCUMENTS

| 4,410,845 | A | 10/1983 | Lockyear |
| 5,198,734 | A | 3/1993 | Johnson |
| 8,334,666 | B2 | 12/2012 | Plitt et al. |
| 8,400,093 | B2 | 3/2013 | Knox et al. |
| 8,480,376 | B2 | 7/2013 | Knox et al. |
| 10,263,561 | B2 | 4/2019 | Huh et al. |
| 2011/0050145 | A1 | 3/2011 | Plitt et al. |
| 2018/0097466 | A1 | 4/2018 | Huh et al. |
| 2021/0102456 | A1* | 4/2021 | Courtwright ......... E21B 47/008 |

FOREIGN PATENT DOCUMENTS

| JP | 2015073361 A | * | 4/2015 |
| WO | 2016148715 A1 | | 9/2016 |

OTHER PUBLICATIONS

JP2015073361A English translation (Year: 2025).*
International Search Report & Written Opinion; PCT Application No. PCT/US2023/035044; mailed Jan. 17, 2024.

* cited by examiner

*Primary Examiner* — Christopher M Koehler
*Assistant Examiner* — Viswanathan Subramanian
(74) *Attorney, Agent, or Firm* — NOVAK DRUCE CARROLL LLP (57) ABSTRACT

Electric motors are used in oil and gas applications to drive downhole submersible pumps. Upon shutdown of such pumps, a column of fluid remains thereabove. When power is removed, the fluid flows back down the casing causing the motor to rotate backward and generate a voltage that is applied up the power cable to the surface. If the motor is restarted before backspin ceases, damage to the drive shaft is likely. Additionally, the up-hole applied voltage during backspin can pose a shock-risk to personnel at the surface. The present systems and methods minimize these risks by identifying backspin events based on determining phase angle differences at the three phases of the permanent magnet motors and alerting relevant personnel and otherwise preventing re-initiation of motor operation until after backspin has ceased.

18 Claims, 5 Drawing Sheets

BACKSPIN MONITOR

TECHNICAL FIELD

The present disclosure generally relates to the detection and management of backspin by an electric submersible pump (ESP), and more specifically to the detection of backspin by an ESP in oil and gas applications that is powered by an electric motor.

BACKGROUND

In typical oil and gas drilling applications, a well bore is drilled down to a reservoir containing such fluids. In order to reach the reservoir, the well bore can include multiple changes in direction and have sections that are vertical, slanted, and/or horizontal. Casing can be inserted into the well bore to provide structure and support to the well bore. The oil, gas or other target fluid in then pumped from the reservoir, through the well bore casing, to the surface, where it is collected.

One way to pump the fluid from the reservoir to the surface utilizes an electrical submersible pump (ESP), driven by an electric motor (e.g., permanent magnet motor, and induction motor) located at the reservoir in the well bore casing. Typically, a power source at the surface provides power to the electric motor via a power cable. In the instance of permanent magnet motors, it is appreciated that the magnetic fields associated with the magnets of the motor remain present even when the motor is not being actively driven. Also, a situation referred to as backspin can occur when pumping ceases, but a column of fluid remains in the casing above the pump. As the column of fluid drains back down toward the reservoir, through the ESP, the pump and motor are driven backward (in the opposite direction to powered operation), inducing a generated voltage up the cable. Backspin occurs with both induction motors and permanent magnet motors, but for reasons detailed below, the effects are more pronounced in the instance of permanent magnet motors which can create dangerous situations and/or cause equipment damage.

BRIEF DESCRIPTION OF THE DRAWINGS

Illustrative embodiments of the present application are described in detail below with reference to the following figures.

DETAILED DESCRIPTION

Certain aspects and examples of this disclosure are provided below. Some of these aspects and embodiments may be applied independently and some of them may be applied in combination as would be apparent to those skilled in the art. In the following description, specific details are at times set forth as examples to aid a thorough understanding of the technology, but should not be considered limitations unless specifically so stated. The included figures and descriptions are intended to provide an enabling disclosure to persons skilled in the art to implement the present technology. It should be appreciated that various changes can be made in the function and arrangement of elements without departing from the scope of the application as set forth in the patented claims.

Again, the instant descriptions are provided as exemplary examples only and are not intended to limit the scope, applicability, or configuration of the claimed methods and arrangements. Rather, disclosure of the technology via the exemplary examples provides those skilled in the art with sufficient description to enable their implementation of the solutions described herein. Regarding the present written description, the articles "a," "an," "the" and "said" are intended to mean that there are one or more of the so-described elements. The terms "comprising," "including" and "having" are open-ended and are intended to be inclusive and mean that there may be additional elements other than those listed. Furthermore, any numerical examples in the following discussion are intended to be non-limiting, and thus additional numerical values, ranges, and percentages are within the scope of the disclosed examples.

Further, while this disclosure describes a land-based drilling system, it will be understood that the equipment and techniques described herein are applicable in sea-based systems, multilateral wells, all types of drilling systems, all types of rigs, wired drill pipe environments, coiled tubing environments, wireline environments, and similar settings and environments.

In oil and gas applications, electric motors are used to drive the downhole submersible pumps and can include induction motors and permanent magnet motors. Permanent magnet motors (PMM) have greater power density than induction motors and therefore can be smaller for the same power and thus favored to downhole applications. As explained above, upon shutdown of an electric submersible pump (ESP), a column of fluid, such as oil, resides above the pump. When power is removed from the pump, the fluid flows back down the casing, through the ESP, causing the associated electric motor to rotate backward and generate a voltage that is applied up the cable to the surface. This upwardly applied voltage on the power cable can extend for a significant amount of time. If the motor is restarted before the backspin event is over, damage can occur, such as drive shaft damage or breakage. Additionally, the up-hole applied voltage during backspin can pose a shock-risk to personnel at the surface. For these reasons among others, it is important to be able to safely detect when backspin is and is not occurring.

A backspin event can be detected and derived from the measurement of voltage in cables fed into the motor. During a forward operation event (for example, pumping fluid from the reservoir to the surface), the voltage applied at induction motors and permanent magnet motors is high. However, induction motors by design are incapable of back-spinning at full forward speed, thus its voltage level during backspin is capped at a low voltage. To the contrary, permanent magnet motors are capable of rotating at full-speed in the opposite direction under backspin conditions. The detection of an existing backspin condition in permanent magnet motors requires more than merely a voltage reading to differentiate whether an existing voltage is being applied (down) to the motor or being generated (up) from the PPM. Therefore, the presently disclosed technology provides systems and methods to detect backspin conditions in a downhole, ESP-powering, permanent magnet motor and provide alerts of the potentially dangerous and/or damaging situation.

Figure 1:
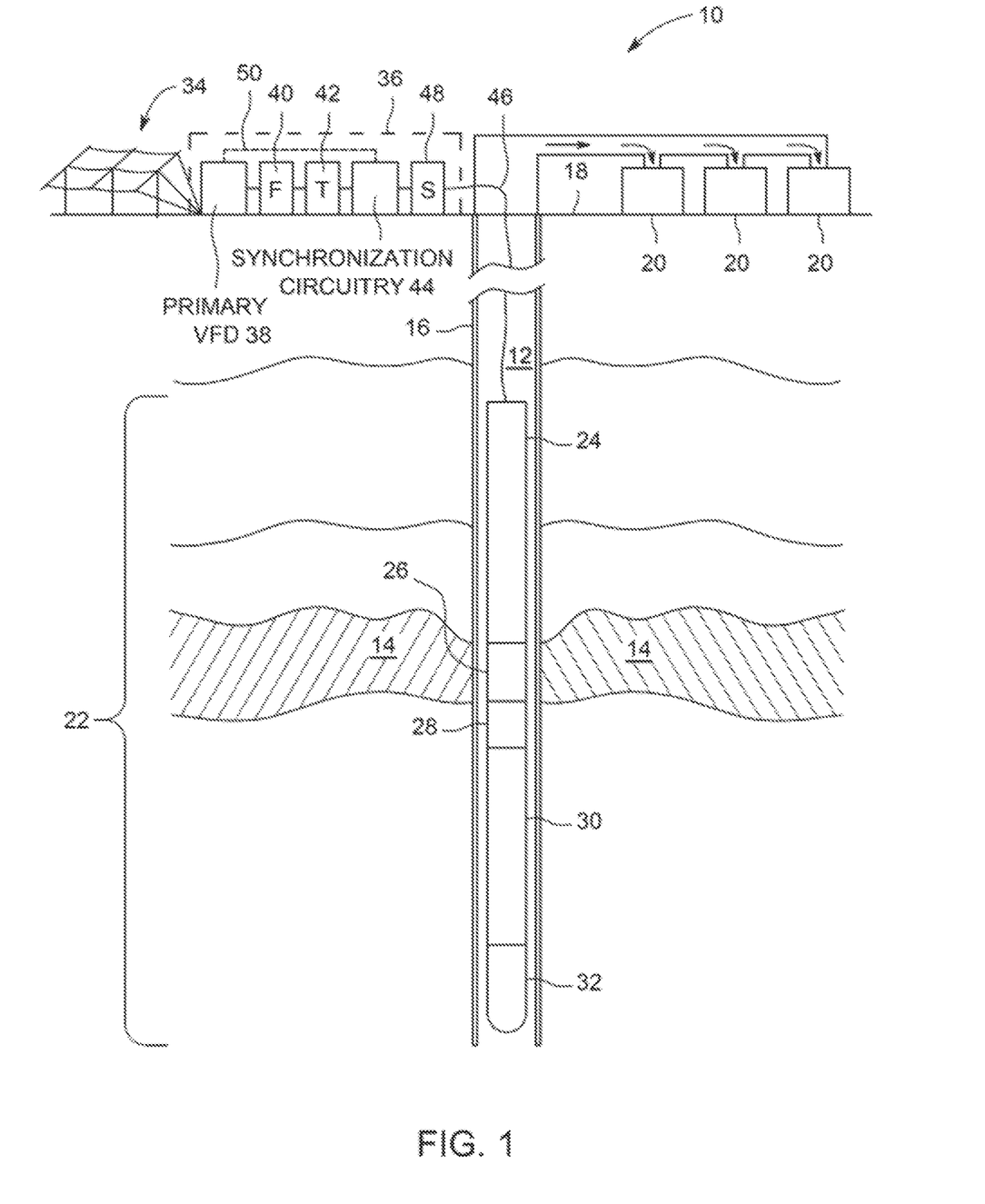
FIG. 1 is a schematic of a hydrocarbon extraction system extracting fluid from an underground reservoir in accordance with aspects of the present disclosure.

FIG. 1 is a schematic of a hydrocarbon extraction system (e.g., well 10) extracting fluid deposits (e.g., oil, gas and the like) from an underground reservoir 14. As shown in FIG. 1, a well bore 12 may be drilled in the ground toward a fluid reservoir 14. Though the well bore 12 shown in FIG. 1 is a vertical well bore 12, well bores 12 may include several changes in direction and may include slanted or horizontal sections. Casing (pipe) 16 is typically inserted into the well bore 12 to provide structure and support to the earthen borehole 12. Fluid deposits from the reservoir 14, may then be pumped to the surface 18 for collection in tanks 20, separation, transportation, and refining. Though there are many possible ways to pump fluids from an underground reservoir 14 to the surface 18, one technique is to use an electrical submersible pump (ESP), as shown in FIG. 1.

When using an ESP, an ESP assembly or system 22 is fed through the well bore casing 16 toward the reservoir 14. The ESP assembly 22 may include a pump 24, an intake 26, a sealing assembly 28, an electric motor 30, and a sensor 32. Power may be drawn from a power source 34 and provided to the electric motor 30 by an ESP control system 36. The power source 34 shown in FIG. 1 is a utility grid, but power may be provided in other ways (e.g., generator, batteries, renewable energies and the like). The ESP control system 36 may include a primary variable frequency drive (VFD) 38, a filter 40, a transformer 42, synchronization circuitry 44, and a cable 46. In some embodiments, one or more sensors 48 are coupled to the cable 46 to measure one or more electrical properties (e.g., voltage, current, inductance, capacitance, impedance) of the variable frequency power signal on the cable 46. The one or more sensors 48 may also measure a voltage on the cable 46 caused by a backspin of the motor 30. It should be understood, that while FIG. 1 shows one embodiment, and other embodiments may omit some elements or have additional elements. The primary VFD 38 receives power from the power source 34 and synthesizes the variable frequency, variable amplitude, AC voltage that drives the motor. In some embodiments, the power output by the primary VFD 38 may be filtered by filter 40. In the present embodiment, the filter 40 is a sine wave filter. However, in other embodiments, the filter may be a low pass filter, a band pass filter, or some other kind of filter. The power may then be stepped up or down by a transformer 42. In the present embodiment, a step-up transformer is used for efficient transmission down the well bore 12 to the ESP assembly 22, however, other transformers or a plurality of transformers may be used. The ESP control system 36 provides power to the motor 30 via the cable 46 to drive the pump 24. As discussed herein, the motor 30 is a permanent magnet motor but can be an induction motor.

The permanent magnet motor 30 can more efficiently convert the variable frequency power signal from the cable 46 to mechanical energy when the rotor position of the motor 30 is synchronized with the phase angle of the current provided to the stator of the motor 30. As discussed in detail below, the synchronization circuitry 44 may directly adjust the phase angle of the current provided via the cable 46 to the motor 30 or indirectly adjust the phase angle of the current provided via the cable through control of the primary VFD 38. In some embodiments, the synchronization circuitry 44 includes a secondary VFD disposed on the high-voltage side of the transformer 42 and configured to deliver full-rated current for a short period of time (e.g., one minute or less) when the electric motor 30 draws more power than the transformer 42 can support for the short period of time. In embodiments with multiple transformers (e.g., a step-up transformer 42 at the surface, and a step-down transformer in the well bore 12, at the end of the cable 46), the secondary VFD of the synchronization circuitry 44 may be installed between the transformers or at the termination of the second transformer.

In some embodiments, the synchronization circuitry 44 includes a controller configured to provide adjustment signals to the primary VFD 38 via a transmission link 50 to adjust the power output provided by the primary VFD 38 to the transformer 42. As discussed herein, the controller that provides adjustment signals to the primary VFD 38 may be configured as a "virtual encoder" for the primary VFD 38. Suitable transmission links 50 may include wired or wireless connections, and the adjustment signals may be analog adjustment signals or digital adjustment signals.

During operation of the ESP assembly 22, a variable frequency power signal output is provided to the ESP assembly 22 via the cable 46 that is fed through the well bore casing 16 from the surface 18 to the ESP assembly 22. The pump 24 may be a centrifugal pump with one or more stages. The intake 26 acts as a suction manifold, through which fluids 14 enter before proceeding to the pump 24. In some embodiments, the intake 26 may include a gas separator. A sealing assembly 28 may be disposed between the intake 26 and the motor 30. The sealing assembly protects the motor 30 from well fluids 14, transmits torque from the motor 30 to the pump 24, absorbs shaft thrust, and equalizes the pressure between the reservoir 14 and the motor 30. Additionally, the sealing assembly 28 may provide a chamber for the expansion and contraction of the motor oil resulting from the heating and cooling of the motor 30 during operation. The sealing assembly 28 may include labyrinth chambers, bag chambers, mechanical seals, or some combination thereof.

The sensor 32 is typically disposed at the base of the ESP assembly 22 and collects real-time system and well bore parameters. Sensed parameters may include pressure, temperature, motor winding temperature, vibration, current leakage, discharge pressure, and so forth. The sensor 32 may provide feedback to the ESP control system 36 and alert users when one or sensed parameters fall outside of expected ranges.

Figure 2:
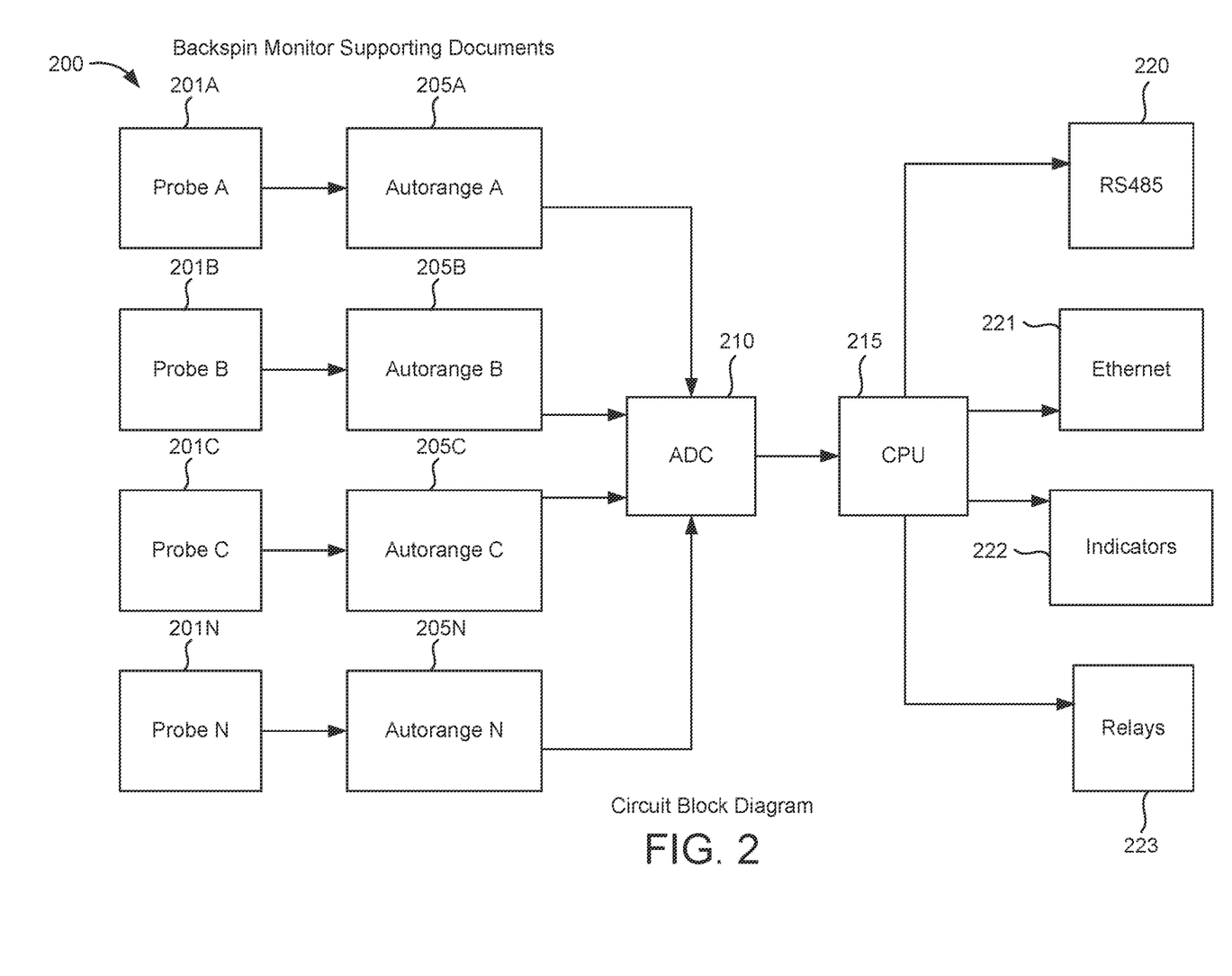
FIG. 2 is a circuit block diagram of an example backspin monitoring system, in accordance with some examples of the present disclosure.

FIG. 2 illustrates a backspin monitoring system 200. Sensors to collect data are included in the backspin monitoring system 200. In at least one example, the sensors can include a first sensor 201A, a second sensor 201B, a third sensor 201C, and a fourth sensor 201N (collectively "probe 201" and/or "probes 201"). The number of sensors is not limited to four, but instead correspond to that which is required to measure the number of individual phases powered by an input connection driving different phases of the electric motor and includes an additional sensor for the neutral line of the motor (e.g., fourth sensor 201N). By way of example, the schematic of FIG. 2 corresponds to a three-phase electric motor having a first phase, a second phase, and a third phase (not displayed). The sensors (i.e., sensors 201A, 201B, 201C, and 201N) can comprise a probe 201 or other detection device capable of measuring voltage and deriving electrical characteristic data therefrom (e.g., voltage waveform, fundamental frequencies, phase angles between the different phases, voltage unbalance factor, estimated true unbalance factor, total harmonic distortion factor, harmonic magnitude factor and other parameters described below), and/or characterizing signals on power input connections of a subterranean well pump (i.e., electric motor) during a forward operation event. In this regard, "a forward operation event" is typified by regular pumping conditions when the electric motor is powering the ESP in the forward, pumping direction.

In at least one example, the probe 201 is located at the secondary side of the step-up transformer to measure the power input connections and/or gather data from an electric motor. The power input connections, in at least one example, can include corresponding step-up transformers of a variable-speed drive of the electric motor. In another aspect, the probes 201 can measure the power output connections of a step-up transformer(s) connected to a variable-speed drive of an electric motor. Such probes can assist in detecting a ground fault condition and help derive information about the power quality as seen by the permanent magnet motors driving the ESP.

Due to the nature of the wide dynamic range of voltages to be measured, the probe 201 can comprise high voltage dividers that reduce the input voltage to a level acceptable by the low-voltage subsequent components. For instance, one or more autoranges 205 can be included in the backspin monitoring system 200 as a subsequent component. Multiple autoranges 205 can be included if widely disparate voltages are expected to be generated and varying degrees of measurement sensitivity will be required. For example, if the voltages detected by the sensors of probe 201 vary from very high to very low, autorange(s) 205 will direct them accordingly for evaluation based on voltage magnitude.

In this regard, autorange 205 can serve the purpose of automatically switching range to capture voltage readings of the wide dynamic range input voltage to (or from) the permanent magnet motor. As one example, some of the ranges in the autorange(s) 205 can include zero to 1200 volts, zero to 2400 volts, and zero to 9600 volts. More specifically, each autorange 205 can increase or decrease its range when the voltage reading from a respective probe 201 is above or below a certain value for at least 10 seconds, for example. This prevents noise from corrupting the voltage measurement. Another benefit of using autorange(s) 205 is higher resolution measurements that facilitate more accurate derivation of electrical characteristics of the input power used to assess backspin conditions of the electric motor. Additionally, each autorange 205 can further scale the input voltage down as necessary so it will be in the input range supported by an analog-to-digital converter (ADC) 210.

An ADC 210 converts an analog input (e.g., voltage or current) to a digital number representing the magnitude of the voltage or current. In one instance, the ADC 210 can sample all four input channels (i.e., probes 201) at a time and capture and store the same in a signal buffer. As an example, the signal buffer can contain 10 seconds or more (but not limited thereto) of waveform data for all the inputs, simultaneously. In this example, the 10 seconds signal buffer is required to measure 0.1 hertz frequency resolution according to the properties of the Fast Fourier Transformation, discussed in detail below. Computations on the at least 10 seconds waveform data can be conducted to determine the electrical characteristics of the power that is input, which then can be utilized in determining whether the electric motor is back spinning.

The signal buffered by the ADC 210 can be input to a central processing unit (CPU) 215 to compute the electrical characteristics of the power input in determining the direction of an electric motor (e.g., permanent magnet motor) and whether the electric motor is back spinning. Algorithms and equations can be executed using the CPU 215 to determine whether the electric motor is spinning and in which direction (pumping versus backspin). In another instance, the CPU 215 can capture the signal data from the ADC 210 and perform computations on the signal data to calculate electrical characteristics (i.e., parameters) from a first portion of the signal data to be compared to a second portion of the signal data. The electrical characteristics calculated from the first portion can be utilized as reference electrical characteristics to be compared to subsequent electrical characteristics computed from later (second) portions of the signal data. In one instance, the CPU 215 compares subsequent electrical characteristics to the reference electrical characteristics to assess whether an uncharacterized operation event is occurring, and whether it is a backspin event relative to the forward operation event. The reference data set includes one or more fundamental frequencies from the analyzed signals and phase angle differences between the different phases. Correspondingly, the subsequent data set contains its own fundamental frequencies from that signal portion and subsequent phase angle differences measured from the subsequent data set.

The determination of the electrical characteristics and identification of a backspin event can be made accessible via Modbus on the RS-485 220 and Ethernet interfaces 221. The CPU 215 can also determine when an unsafe situation is occurring via indicators 222 and/or relays 223. Exemplary, CPU 215 can be a local processor located at the rig site. In another example, the processor can be a remote processor, such as in a virtual processing environment and/or an electronic device located off-site. The system 200 can also include an operations controller (not shown) usable to control the downhole electric motor upon the determination that a backspin event is occurring.

Figure 3:
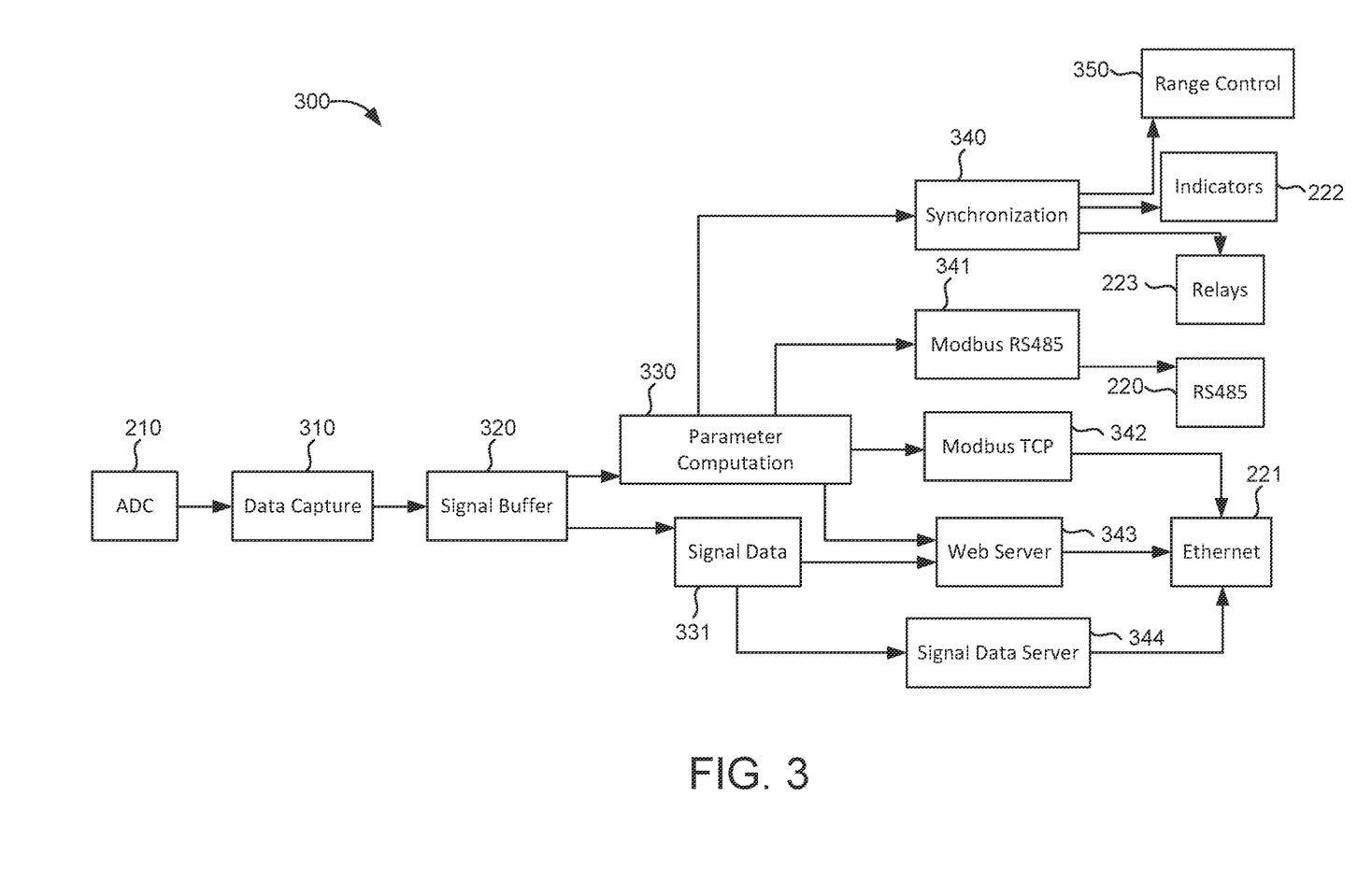
FIG. 3 is a flow chart for the process of determining a backspin in an electric motor, in accordance with aspects of the present disclosure.

FIG. 3 is a flow chart illustrating a process 300 for determining whether backspin is occurring in the downhole electric pump motor (e.g., permanent magnet motor). In the illustration, the process 215 begins with the CPU 215 capturing voltage measurement digital data from the ADC 210 at the data capture 310. The data captured at the data capture 310 is stored in signal buffer 320. Exemplarily, the signal buffer 320 can contain about 10 seconds of waveform data from each of the probes 201. Use of a 10-second buffer facilitates a correspondence of 0.1 hertz per second which yields more precise resolution with reduced noise that facilitates study and interpretation of the data. Additionally, the signal buffer 320 can contain the corresponding range values and voltage values measured by the respective probes 201.

At parameter computation 330, parameters can be computed via the CPU 215 to derive the electrical characteristics of the power input connections of the electric motor. The parameter computation 330 can be an assessment of whether backspin is occurring, a characteristic that is derived by assessing whether the electric motor is spinning, and if so, in what direction. As an example, a backspin condition can be derived from phase angle measurement comparisons (differences) between sequential phase angle measurements. Relatedly, if backspin is occurring, the parameter computation 330 can be a determination of produced voltage magnitude and an assessment of whether it is a dangerously high voltage about which an alert should be issued.

In one example, the parameter computation 300 includes three measurement equations that utilize four measured inputs: (1) average voltage, (2) peak-to-peak voltage, and (3)

root-mean-square (RMS) voltage. The three measurement equations can be represented by the following equations (1)-(3).

$$v_{avg,x} = \frac{\sum_{i=0}^{n-1} \text{signal}_{i,x}}{n} \quad (1)$$

$$v_{pp,x} = \max(\text{signal}_{i,x}) - \min(\text{signal}_{i,x}) \quad (2)$$

$$v_{rms,x} = \sqrt{\sum_{i=0}^{n-1} \frac{(\text{signal}_{i,x} - v_{avg,x})^2}{n}} \quad (3)$$

In equations (1), (2), and (3), signal$_{i,x}$ represents the voltage value measured by probes 201. The variable n in equations (1) and (3) is a variable representing the number of the term to find and can be a natural number. In equation 1, $v_{avg,x}$ represents the equation for the average voltage of the entire signals collected by probes 201. In equation 2, $v_{pp,x}$ represents the equation for peak-to-peak voltage. In other words, $v_{pp,x}$ is the maximum signal subtracted by the minimum signal of each input channel within the past 10 seconds of the waveform data produced by the ADC 210. In equation 3, $v_{rms,x}$ represents the root-mean-square voltage equation.

A Fast Fourier Transformation (FFT) can be conducted after calculating the three measurement equations to produce a spectrum (e.g., $v_{pp,x}$), an array of numbers representing the magnitude and phase of each frequency component of the signal from signal buffer 320. In other words, a FFT can convert a signal into individual spectral components and provide frequency information about the signal. The FFT, in one instance, can be computed on the 10 seconds of waveform data for each input channel outputted from the signal buffer 320.

The spectrum can then be used to compute spectrum equations: (1) fundamental frequency, (2) fundamental magnitude (in volts), and (3) phase angle difference between phases on the power inputs (probes A and B, probes B and C, and probes A and C). The fundamental frequency equation can be expressed as:

$$f_x = \max(|\text{spectrum}_{i,x}|), \quad (4)$$

$$f \text{ or } f \leq f_{Threshold, fundamental}$$

The fundamental magnitude equation can be expressed as:

$$v_{f,x} = |\text{spectrum}_{i,x}|, \quad (5)$$

$$f \text{ or } i \text{ at fundamental frequency}$$

The phase angle equation can be expressed as:

$$\emptyset_{xy} = \emptyset_X - \emptyset_Y, \emptyset_X = <\text{spectrum}_{i,x} \quad (6)$$

for $i$ at fundamental frequency (normalized to ±180°)

where spectrum$_{i,x}$ value is derived from the FFT on the signals outputted from the signal buffer 320. The fundamental frequency can be applied to find the frequency at which the maximum magnitude of the spectrum, calculated by FFT, is the highest and that is for up to a maximum value that is predefined by a fundamental frequency threshold. In some instances, the $f_{Threshold, fundamental}$ can be defined as 500 hertz. In one aspect, the $f_{Threshold, fundamental}$ can be between 0 and 500 hertz. The value determined by the fundamental frequency equation specifies the frequency the drive is intending to run the electric motor at. The fundamental magnitude equation can be applied to determine the magnitude of the frequency (in terms of voltages) of the drive that is intended to run the electric motor. In this context, hertz is defined as rotations per second. Typically, the magnitude of the voltage comprises a linear relationship between the speed the motor is running and the value of the voltage. By way of example, the faster the motor is running, the higher the voltage will be and vice versa.

The fundamental frequencies equation (4) can be applied to determine whether an uncharacterized operation event is backspinning. The assessment of backspin is determined after identifying subsequent fundamental frequencies to compare whether it is less than an earlier reference fundamental frequency, but also less than a threshold frequency that is less than the reference fundamental frequencies.

Knowing fundamental frequency and/or fundamental magnitude values is beneficial because the rotational direction and speed of the electric motor can be determined therefrom, dictating when it is safe to power-up the motor, after a backspin event, without risking equipment damage. By way of example, if the motor's driveshaft is backspinning at a frequency above the determined threshold, and operation of the motor is initiated to run in the opposing direction against the backspin, then the shaft is susceptible to breaking. This results in needless downtime and can ultimately halt the entire operation necessitating costly repair and/or replacement of the shaft and potentially the electric motor.

The phase angle equation is a parameter used in determining whether backspin is occurring or the motor is operating in a forward operation event. $\emptyset_Y$ can be a variable that represents one of the input channel's phases and $\emptyset_X$ can represent a second input channel's phases. The phase angle equation can take into account the difference between the phase angles of each input channel, i.e., probe(s) 201. For example, the phase angle differences can be between probe-A 201A minus probe-B 201B; probe-B 201B minus probe-C 201C; probe-C 201C minus probe-A 201A; and/or combinations thereof. In one aspect, when an electric motor is spinning backward, a positive phase angle difference of 120 degrees is present. To the contrary, a negative 120 degree phase angle difference indicates that the electric motor is in forward operation (pumping). In one beneficial embodiment, knowing the fundamental frequency and phase angle differences respectively enables determination of how fast the electric motor is rotating and in which direction.

The detectability of backspin in different electric motors varies based at least in part on motor type. For example, because an induction motor by nature produces a substantially smaller voltage during backspin than in forward operation, all that must be done to identify backspin operation is measure the voltage on the motor's power cable.

Permanent magnet motors, however, have a capability to spin at high rates of speed in both the forward and the backward direction. Therefore, voltage magnitude measured on the motor's power cable is not indicative of motor spin direction. But, the measurement of phase angle difference (negative versus positive) is indicative of forward spin versus backspin of the permanent magnet motor. Whether forward operation is defined by positive or negative phase angle difference is determined by the manufacturer and/or design of the permanent magnet motor, but when known, it is determinative.

Other parameters can then be derived from spectrum equations and three measurement equations. The parameters include: (1) variations of unbalance, (2) detecting backspin, (3) detecting ground fault, (4) total harmonic distortion, and (5) harmonic magnitude. The variations of unbalance can include parameters: (1) phase voltage unbalance rate, (2) voltage unbalance factor, and (3) estimated true unbalance. Phase voltage unbalance rate can be expressed as:

$$\% PVUR = \frac{\text{max voltage deviation from the } avg \text{ phase voltage}}{avg \text{ phase voltage}} \cdot 100 \quad (7)$$

The phase voltage unbalance rate is a measurement of how similar the voltages are on all three of the phases. The closer the phase voltage unbalance rate is to zero, the more balance % PVUR is.

The voltage unbalance factor can be expressed as:

$$\% VUF = \frac{V_n}{V_p} \quad (8)$$

where $V_p$ can be computed by the equation:

$$V_p = \frac{V_{ab} + a \cdot V_{bc} + a^2 \cdot V_{ca}}{3} \quad (9)$$

where $V_n$ can be computed by the equation:

$$V_n = \frac{V_{ab} + a^2 \cdot V_{bc} + a \cdot V_{ca}}{3} \quad (10)$$

Where $\alpha=1<120°$ and $\alpha^2=1<240°$. The voltage unbalance factor, in some cases, uses the spectrum data and does a circulation that also is sensitive to how balanced the phase differences are between the phases. For instance, if phases are 120 degrees apart from one phase to the next then that voltage unbalance factor would be zero indicating that the electric motor is balanced.

Estimated true unbalance can be expressed as:

$$\% \text{ voltage unbalance} = \frac{82 \cdot \sqrt{V_{abe}^2 + V_{bce}^2 + V_{cae}^2}}{avg \text{ line voltage}} \quad (11)$$

where $V_{abe}^2$=difference between the line voltage $V_{ab}$ and the average line voltage and the like. The estimated true unbalance can be another way to measure how similar the voltage is on all three of the phases or measuring unbalance. The estimated true unbalance and the phase voltage unbalance rate can be based on voltages. The voltage unbalance factor can be sensitive to phase difference, unlike the estimated true unbalance and the phase voltage unbalance rate.

A backspin detection parameter can be utilized to detect an electric motor is back spinning and can be expressed as:

$$\phi_{XY} = 120° \pm 45° \text{ and } f_x > f_{Threshold,backspin} \quad (12)$$

In at least one example, backspin can be detected based on phase angle difference between two probes 201 or channel inputs when operating in the forward direction is known if the subsequent phase angle value is opposite of the phase angle when operating in the forward direction. In another aspect, backspin detection can be based on any of the phase angle differences between phases being 120 degrees and plus or minus 45 degrees, as shown in equation (12). A negative angle difference can indicate a forward spin direction, whereas a positive angle difference can indicate the electric motor is back-spinning. In another instance, a determination of a negative phase angle difference from a reference phase angle difference compared to a subsequent phase angle difference can indicate an uncharacterized operation event that is a backspin event.

In another aspect, when applying the backspin detection parameter to determine the existence of backspin, a reference phase angle difference between the first, second, and third phases can be identified during an uncharacterized operation event. The reference phase angle difference can then be compared to a subsequent phase angle difference. A backspin condition can then be determined based on the comparison of the phase angle difference between the reference and subsequent phase angle difference.

A ground fault detected parameter can be expressed as:

$$\% PVUR > \% PVUR_{Threshold} \quad (13)$$

where % $PVUR_{Threshold}$ can be a predefined phase voltage unbalance rate. For instance, when the parameter is predefined at 25% and the ground fault detected is greater than 25% then there is a ground fault. Ground fault detected can indicate one of the phases being grounded, not connected, and a poor connection and can be utilized as a diagnostic tool.

The parameters can also include (1) total harmonic distortion and (2) harmonic magnitude. The total harmonic distortion parameter can be expressed as:

$$\% THD_F = \frac{\sqrt{V_2^2 + V_3^2 + V_4^2 + \ldots}}{V_1} \cdot 100 \quad (14)$$

The harmonic magnitude parameter can be expressed as:

$$\% \text{ Harmonic}_n = \frac{V_n}{V_1} \cdot 100, \quad (15)$$

for $n = 2$ through 25

In one instance, the harmonic magnitude is for each of the individual harmonics. In applying the harmonic magnitude parameter, by way of example, if the electric motor is running at 60 hertz, then the second harmonic would be 120 hertz, the third harmonic would be 180 hertz, and so forth. The measurement is conducted from two through twenty-five. A table of frequency components of each of the inputs as a percentage of the magnitude can then be created. The total harmonic distortion parameter can then take into account the magnitudes of all of the harmonics that are captured within the spectrum and yield a single number that indicates the percentage of distortion.

After computing the parameter computation 330, the process 215 can synchronize the results via a synchronization 340 to output to personnel. The synchronization 340 synchronizes the results of the parameter computation into a tangible signal. Some examples of tangible signals or output can include a range control 350, indicators 222, and relays 223 to signal the presence of a high voltage situation making the environment an unsafe working condition and/or the presence of an uncharacterized operation event being a backspin event. Examples of indicators 222 can include tower lights, color codes displayed to represent safe and unsafe working conditions, graphical user interfaces, visualizations or audio and the like. Because of the magnitude of the potential high risk and severe injuries, the entire system 200 including the range control 350, indicators 222, and relays 223 can be powered by a backup power source such as solar panels, batteries, renewable energy, generators and the like.

In some instances, the parameter computation 330 can be presented to an end user via a set of Modbus registers (i.e., Modbus RS485 341 and Modbus TCP 342) that can be read by an Ethernet Cable or a cable capable of transferring audio and/or data. In one example, a drive can read the information provided by the Modbus registers and determine whether to run the electric motor based on whether a detection of back spin is present. In another aspect, the parameter computation and data can be outputted to a web server 343 and accessed to the data in a tabular form visually in a web browser. Both the Modbus TCP 342 and web server 343 can be made accessible remotely via Ethernet 221.

In one aspect, the raw waveforms (i.e., signal data 331) of the signal buffer 320 can be made accessible and displayed in a graph via the Ethernet 221. Additionally, in at least one example, the web server 343 can display the signal data 331 as well. The signal data 331, in some aspects, can be displayed in a waveform graph, sine wave, square wave, bar graph and the like. The signal data 331 can detail a breakdown of all the frequencies of the signal, the harmonic magnitude, all the harmonics and frequency in the spectrum. Each frequency corresponds to a 0.1 hertz resolution and at each point a magnitude is associated with the point so that the highest magnitude illustrates the fundamental frequency.

Figure 4:
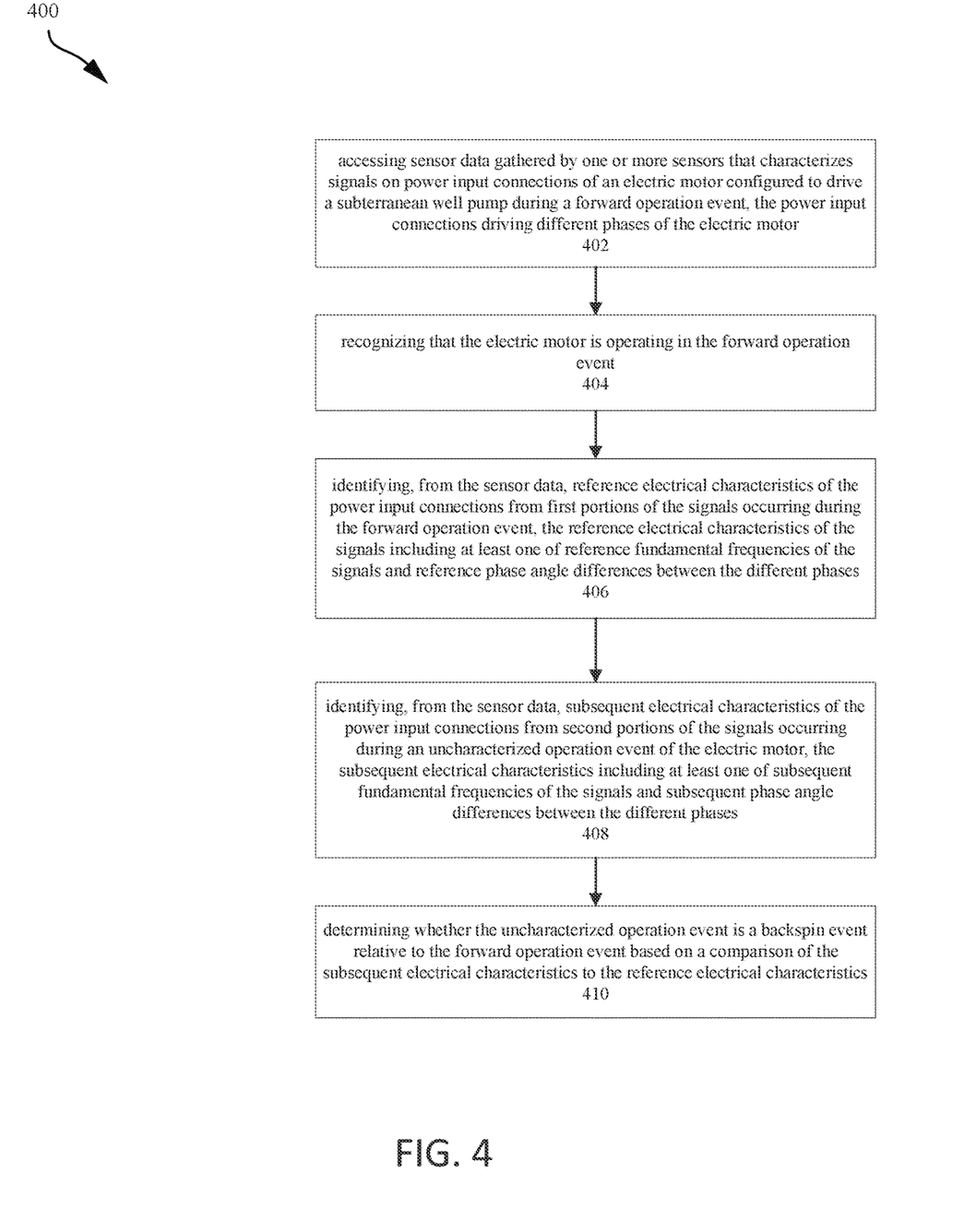
FIG. 4 is a flowchart illustrating an example process for monitoring a backspin event, according to some aspects of the present disclosure.

FIG. 4. Is a flowchart illustrating an exemplary process 400 for detecting and monitoring a backspin electric motor. At block 402, the process 400 includes accessing sensor data gathered by one or more sensors that characterizes signals on power input connections of an electric motor configured to drive a subterranean well pump during a forward operation event, the power input connections driving different phases of the electric motor. In some examples, the power input connections can include corresponding step-up transformers of a variable-speed drive of the electric motor, and the one or more sensors are configured, in relation to the step-up transformers, to gather the sensor data of the signals at secondary sides of the step-up transformers.

At block 404, the process 400 includes recognizing that the electric motor is operating in the forward operation event. In some aspects, the electric motor is a permanent magnet motor and is a three-phase motor comprising a first phase, a second phase, and a third phase, and the one or more sensors include a plurality of sensors comprising a first sensor, a second sensor, and a third sensor, and each of the first sensor, the second sensor, and the third sensor corresponds to a phase of the three-phase motor.

At block 406, the process 400 includes identifying, from the sensor data, reference electrical characteristics of the power input connections from first portions of the signals occurring during the forward operation event, the reference electrical characteristics of the signals including at least one of reference fundamental frequencies of the signals and reference phase angle differences between the different phases.

At block 408, the process 400 includes identifying, from the sensor data, subsequent electrical characteristics of the power input connections from second portions of the signals occurring during an uncharacterized operation event of the electric motor, the subsequent electrical characteristics including at least one of subsequent fundamental frequencies of the signals and subsequent phase angle differences between the different phases At block 410, the process 400 includes determining whether the uncharacterized operation event is a backspin event relative to the forward operation event based on a comparison of the subsequent electrical characteristics to the reference electrical characteristics.

In some instance, the process 400 can include identifying phase angle differences between the first phase, the second phase, and the third phase of the three-phase motor during the uncharacterized operation event from the subsequent electrical characteristics of the power input connections, comparing the phase angle differences between the first phase, the second phase, and the third phase to the reference phase angle differences, and determining whether the uncharacterized operation event is the backspin event based on the comparison of the phase angle differences between the first phase, the second phase, and the third phase to the reference phase angle differences.

Figure 5:
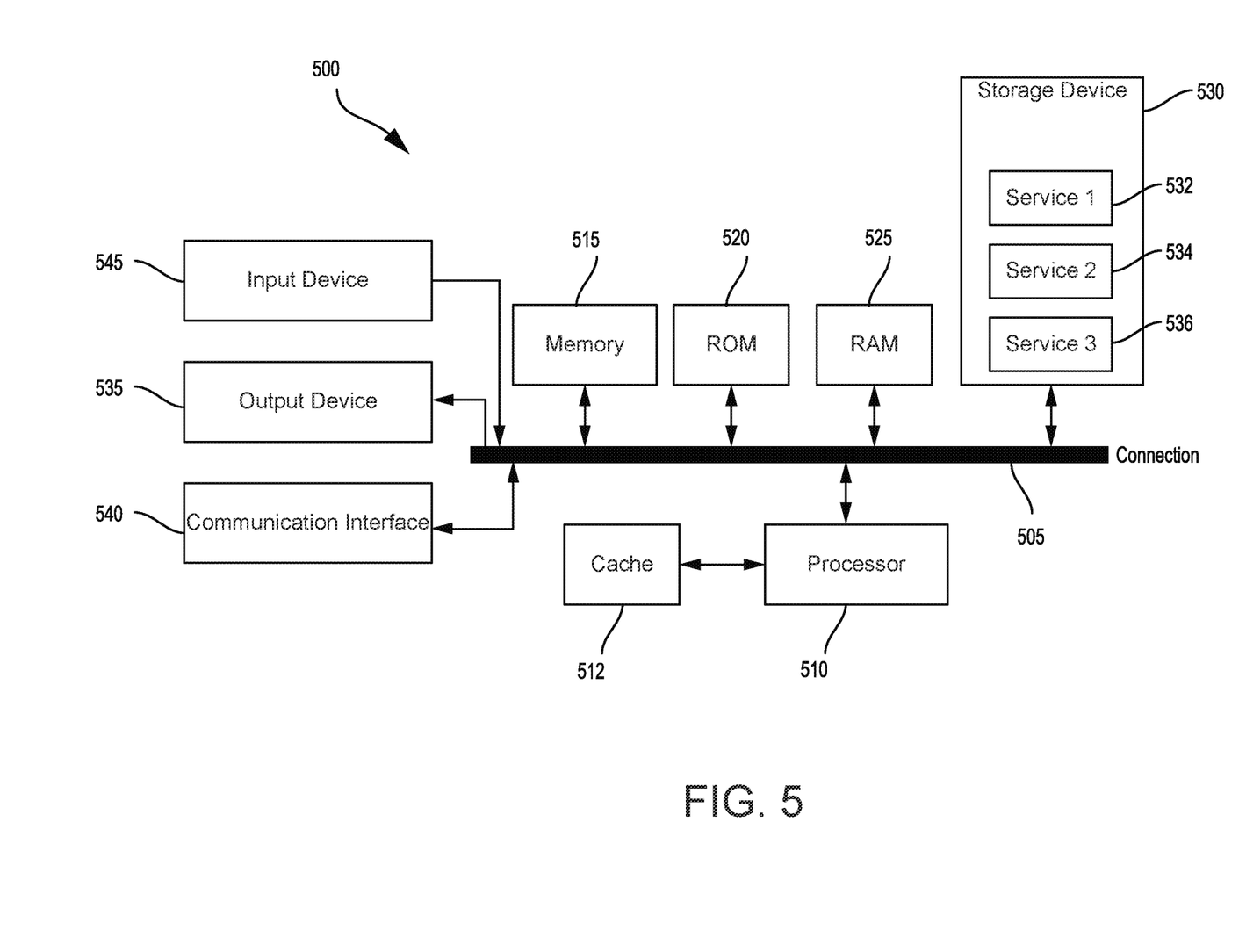
FIG. 5 illustrates an example processor-based system with which some aspects of the subject technology can be implemented.

FIG. 5 illustrates an example apparatus (e.g., a processor-based system) with which some aspects of the subject technology can be implemented. For example, the processor-based system 500 can be any computing device making up an electronic device and/or a virtual processing environment. Example system 500 includes at least one processing unit (CPU or processor) 510 and connection 505 that couples various system components, including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache and the like. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech and the like. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L6), resistive random-access memory (RRAM/ReRAM), phase change memory (PCM), spin transfer torque RAM (STT-RAM), another memory chip or cartridge, and/or a combination thereof.

Storage device 530 can include software services, servers, services and the like that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535 and the like to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors and the like that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
accessing sensor data gathered by one or more sensors that characterizes signals on power input connections of an electric motor configured to drive a subterranean well pump during a forward operation event, the power input connections driving different phases of the electric motor;
converting the sensor data to waveform data having a bounded range of time generated by a signal buffer, and wherein the range of time correlates to predefined frequencies for computing reference fundamental frequencies and subsequent fundamental frequencies;
recognizing that the electric motor is operating in the forward operation event;
identifying, from the waveform data, reference electrical characteristics of the power input connections from first portions of the signals occurring during the forward operation event, the reference electrical characteristics of the signals are based on reference phase angle differences between the different phases;
identifying, from the waveform data, subsequent electrical characteristics of the power input connections subsequent to the first portions of the signals occurring during an uncharacterized operation event of the electric motor, the subsequent electrical characteristics are based on subsequent phase angle differences between the different phases; and
determining whether the uncharacterized operation event is a backspin event relative to the forward operation event based on a comparison of the subsequent electrical characteristics to the reference electrical characteristics including a comparison of the subsequent fundamental frequencies being less than the reference fundamental frequencies and a threshold frequency, wherein the threshold frequency is less than the reference fundamental frequencies.

2. The method of claim 1, wherein the power input connections comprise corresponding step-up transformers of a variable-speed drive of the electric motor, and the one or more sensors are configured, in relation to the step-up transformers, to gather the sensor data of the signals at secondary sides of the step-up transformers.

3. The method of claim 1, wherein the electric motor is a permanent magnet motor.

4. The method of claim 1, wherein the electric motor is a three-phase motor comprising a first phase, a second phase, and a third phase, and the one or more sensors include a plurality of sensors comprising a first sensor, a second sensor, and a third sensor, and each of the first sensor, the second sensor, and the third sensor corresponds to a phase of the three-phase motor, the method further comprising:
identifying phase angle differences between the first phase, the second phase, and the third phase of the three-phase motor during the uncharacterized operation event from the subsequent electrical characteristics of the power input connections;
comparing the phase angle differences between the first phase, the second phase, and the third phase to the reference phase angle differences; and
determining whether the uncharacterized operation event is the backspin event based on the comparison of the phase angle differences between the first phase, the second phase, and the third phase to the reference phase angle differences.

5. The method of claim 4, further comprising:
determining that the phase angle differences between the first phase, the second phase, and the third phase are negative relative to corresponding phase angle differences in the reference phase angle differences; and
determining that the uncharacterized operation event is the backspin event based on the phase angle differences between the first phase, the second phase, and the third phase being negative relative to the corresponding phase angle differences in the reference phase angle differences.

6. The method of claim 1, wherein the subsequent electrical characteristics include at least one of: a voltage unbalance factor, an estimated true unbalance factor, a total harmonic distortion factor, and a harmonic magnitude factor, the method further comprising determining whether the uncharacterized operation event is the backspin event based on a comparison of one or more of the voltage unbalance factor, the estimated true unbalance factor, the total harmonic distortion factor, and the harmonic magnitude factor to the reference electrical characteristics.

7. The method of claim 1, further comprising controlling operation of the electric motor based on the determination whether the uncharacterized operation event is the backspin event.

8. The method of claim 1, further comprising presenting an indication of whether the uncharacterized operation event is the backspin event through a graphical user interface.

9. A system comprising:
one or more processors; and
at least one computer-readable storage medium having stored therein instructions which, when executed by the one or more processors, cause the one or more processors to:
access sensor data gathered by one or more sensors that characterizes signals on power input connections of an electric motor configured to drive a subterranean well pump during a forward operation event, the power input connections driving different phases of the electric motor;
convert the sensor data to waveform data having a bounded range of time generated by a signal buffer, and wherein the range of time correlates to predefined frequencies for computing reference fundamental frequencies and subsequent fundamental frequencies;
recognize that the electric motor is operating in the forward operation event;
identify, from the waveform data, reference electrical characteristics of the power input connections from first portions of the signals occurring during the forward operation event, the reference electrical characteristics of the signals are based on reference phase angle differences between the different phases;

identify, from the waveform data, subsequent electrical characteristics of the power input connections subsequent to the first portions of the signals occurring during an uncharacterized operation event of the electric motor, the subsequent electrical characteristics are based on subsequent phase angle differences between the different phases; and determine whether the uncharacterized operation event is a backspin event relative to the forward operation event based on a comparison of the subsequent electrical characteristics to the reference electrical characteristics including a comparison of the subsequent fundamental frequencies being less than the reference fundamental frequencies and a threshold frequency, wherein the threshold frequency is less than the reference fundamental frequencies.

10. The system of claim 9, wherein the power input connections comprise corresponding step-up transformers of a variable-speed drive of the electric motor, and the one or more sensors are configured, in relation to the step-up transformers, to gather the sensor data of the signals at secondary sides of the step-up transformers.

11. The system of claim 9, wherein the electric motor is a permanent magnet motor.

12. The system of claim 9, wherein the electric motor is a three-phase motor comprising a first phase, a second phase, and a third phase, and the one or more sensors include a plurality of sensors comprising a first sensor, a second sensor, and a third sensor, and each of the first sensor, the second sensor, and the third sensor corresponds to a phase of the three-phase motor, the instructions further comprising:

identifying phase angle differences between the first phase, the second phase, and the third phase of the three-phase motor during the uncharacterized operation event from the subsequent electrical characteristics of the power input connections;

comparing the phase angle differences between the first phase, the second phase, and the third phase to the reference phase angle differences; and determining whether the uncharacterized operation event is the backspin event based on the comparison of the phase angle differences between the first phase, the second phase, and the third phase to the reference phase angle differences.

13. The system of claim 12, further comprising:
determining that the phase angle differences between the first phase, the second phase, and the third phase are negative relative to corresponding phase angle differences in the reference phase angle differences; and determining that the uncharacterized operation event is the backspin event based on the phase angle differences between the first phase, the second phase, and the third phase being negative relative to the corresponding phase angle differences in the reference phase angle differences.

14. The system of claim 9, wherein the subsequent electrical characteristics include one or more of a voltage unbalance factor, an estimated true unbalance factor, a total harmonic distortion factor, and a harmonic magnitude factor, the instructions further comprising determining whether the uncharacterized operation event is the backspin event based on a comparison of one or more of the voltage unbalance factor, the estimated true unbalance factor, the total harmonic distortion factor, and the harmonic magnitude factor to the reference electrical characteristics.

15. The system of claim 9, further comprising controlling operation of the electric motor based on the determination whether the uncharacterized operation event is the backspin event.

16. The system of claim 9, further comprising presenting an indication of whether the uncharacterized operation event is the backspin event through a graphical user interface.

17. A non-transitory computer-readable storage medium comprising at least one instruction for causing a computer or processor to:

access sensor data gathered by one or more sensors that characterizes signals on power input connections of an electric motor configured to drive a subterranean well pump during a forward operation event, the power input connections driving different phases of the electric motor;

convert the sensor data to waveform data having a bounded range of time generated by a signal buffer, and wherein the range of time correlates to predefined frequencies for computing reference fundamental frequencies and subsequent fundamental frequencies;

recognize that the electric motor is operating in the forward operation event;

identify, from the waveform data, reference electrical characteristics of the power input connections from first portions of the signals occurring during the forward operation event, the reference electrical characteristics of the signals are based on reference phase angle differences between the different phases;

identify, from the waveform data, subsequent electrical characteristics of the power input connections subsequent to the first portions of the signals occurring during an uncharacterized operation event of the electric motor, the subsequent electrical characteristics are based on subsequent phase angle differences between the different phases; and determine whether the uncharacterized operation event is a backspin event relative to the forward operation event based on a comparison of the subsequent electrical characteristics to the reference electrical characteristics including a comparison of the subsequent fundamental frequencies being less than the reference fundamental frequencies and a threshold frequency, wherein the threshold frequency is less than the reference fundamental frequencies.

18. The non-transitory computer-readable medium of claim 17, wherein the electric motor is a three-phase motor comprising a first phase, a second phase, and a third phase, and the one or more sensors include a plurality of sensors comprising a first sensor, a second sensor, and a third sensor, and each of the first sensor, the second sensor, and the third sensor corresponds to a phase of the three-phase motor, the at least one instruction further comprising:

identifying phase angle differences between the first phase, the second phase, and the third phase of the three-phase motor during the uncharacterized operation event from the subsequent electrical characteristics of the power input connections;

comparing the phase angle differences between the first phase, the second phase, and the third phase to the reference phase angle differences; and determining whether the uncharacterized operation event is the backspin event based on the comparison of the phase angle differences between the first phase, the second phase, and the third phase to the reference phase angle differences.

* * * * *